Dec. 8, 1936.  H. T. LAMBERT  2,063,445
MOMENTUM ACTUATED BRAKE APPARATUS
Filed March 28, 1935  2 Sheets-Sheet 1
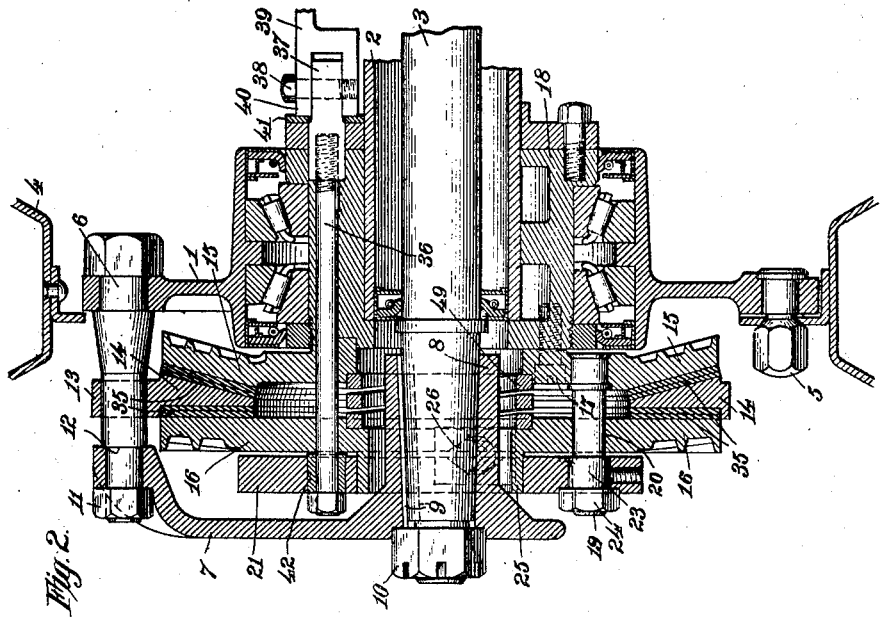
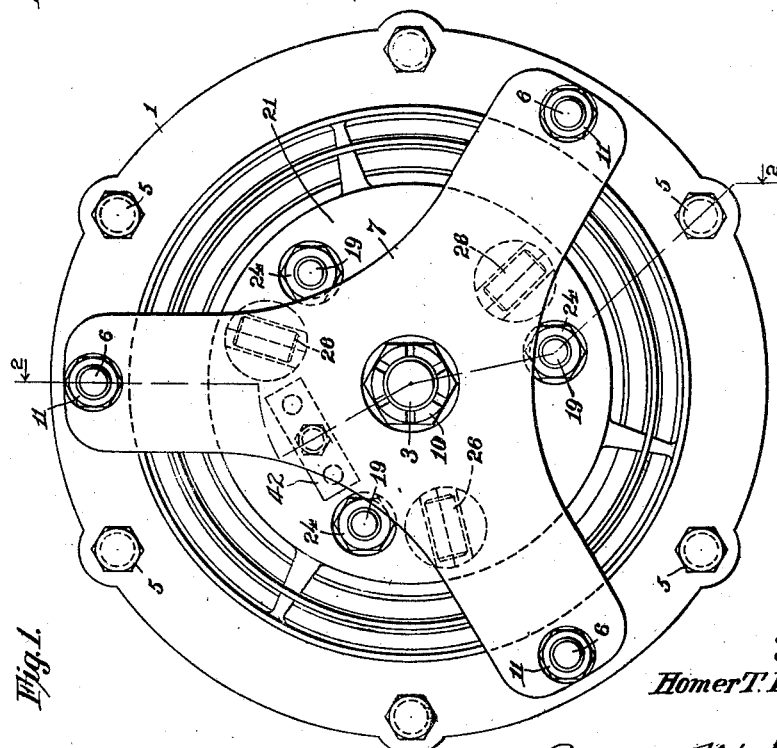
Inventor:
Homer T. Lambert,
By Edgar M. Kitchin
his Attorney.

Dec. 8, 1936. H. T. LAMBERT 2,063,445
MOMENTUM ACTUATED BRAKE APPARATUS
Filed March 28, 1935    2 Sheets-Sheet 2
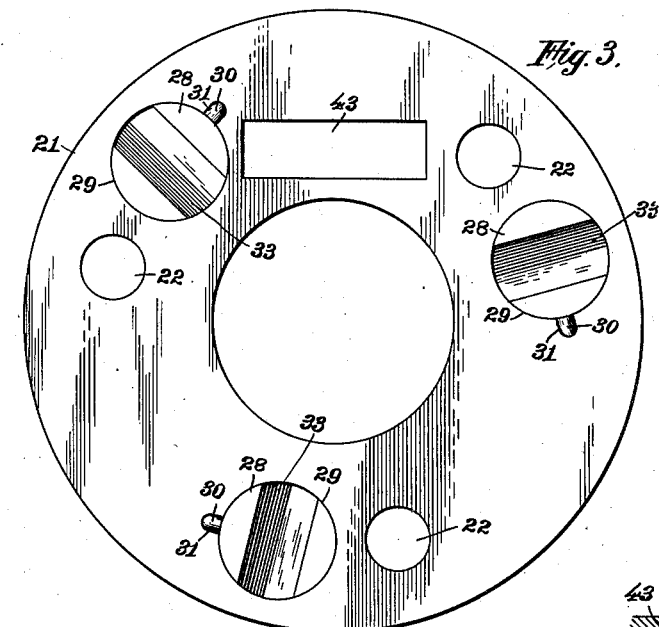
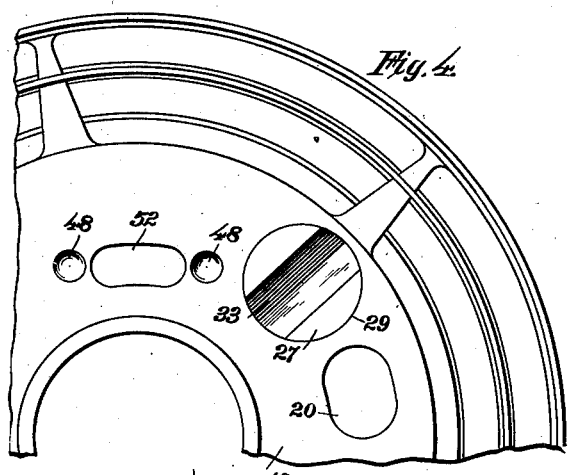
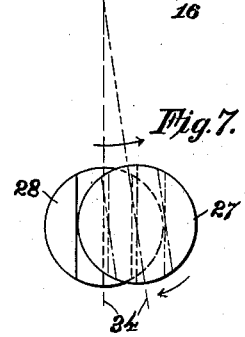
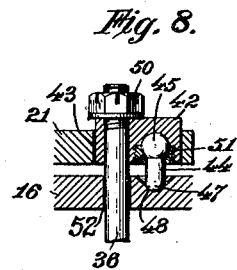
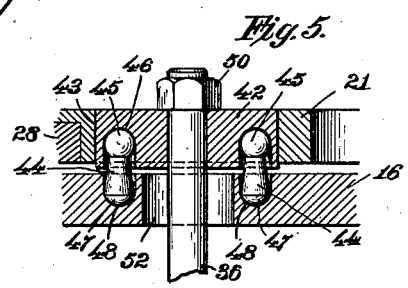
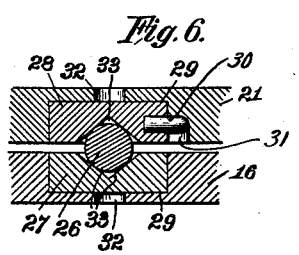
Inventor:
Homer T. Lambert,
By Edgar M. Kitchin,
his Attorney.

Patented Dec. 8, 1936

2,063,445

UNITED STATES PATENT OFFICE 2,063,445

MOMENTUM-ACTUATED BRAKE
APPARATUS

Homer T. Lambert, St. Joseph, Mich.

Application March 28, 1935, Serial No. 13,556

9 Claims. (Cl. 188—72)

This invention relates to improvements in power transmission and control apparatus such as brakes, and has as its characterizing object the transfer of power under conditions whereby the direct engagement of the power transferring element acts to render more efficient and effective the process of power transference; and this application for patent is a part continuation of my co-pending application Serial No. 716,401, filed March 19, 1934.

A further object is the further improvement of parts of the apparatus disclosed in my said co-pending application.

In more detail, an object in view is the effective and balanced initial actuation from the prime actuator with all friction reduced to minimum.

A further object is the provision of means for imparting the initial thrust means of the prime actuator means for setting up a crowding force between a relatively fixed part and a braking part for effecting such movement of said braking part as to insure maximum nicety of government of the application of the power transmitting apparatus.

Another object in view is the substantially complete elimination of frictional resistance to the power developed thrust between the power plate and the braking plate or disc of a brake mechanism by means capable of easy and inexpensive construction.

A further object is the elimination of wear to practically a complete degree, and a corollary object is the provision of means for facilitating substitution of worn parts when and if wear occurs.

A still further object is the constructing of brake mechanism highly responsive and functioning relative to the surface on which the wheel or other part is moving governed by such brake mechanism whereby, when the wheel has its traction reduced, the braking action will be proportionally reduced and the converse action will occur with the increase of such traction; and in greater detail a still further object is the accomplishing of this relative action automatically and independently of any attempted control by the operator.

A still further object is the maintenance of alinement of the cooperating parts for effecting maximum, dependable operation.

With these and still further objects in view, as will in part hereinafter become apparent and in part be stated, the invention includes improvements in features of constructions, combinations, and arrangements of parts set forth in my above-identified co-pending application.

The invention further includes a prime actuator for imparting the initial movement to the braking means and a thrust pivot-pin or toggle link having an endwise thrust bearing against each of the two parts for the transmission of the thrust.

The invention still further includes a plurality of said thrust pins or toggle links co-ordinated to cooperate in the delivery of the thrust for imparting and maintaining a balanced stress for effecting and controlling action of the braking means.

The invention also includes detachable bearing surface means for the crowding or power thrust means.

The invention still further includes movable bearing surface means for the crowding or power thrust means for varying angularity of such surface relative to the action of the crowding or power thrust means.

The invention still further includes cylindrical rollers between a power plate and a brake disc engaging inclined surfaces for imparting a thrust to the brake disc when there is relative angular movement between the two elements, the disc and the plate, means being provided for compensating for the cylindrical form of the roller while moving in the path of an arc.

The invention still further includes as such compensating means a movable plate providing the bearing surface for the roller.

The invention still further includes such a plate in the form of a disc mounted to oscillate in proportion to its bodily travel on an arcuate path.

The invention still further includes in brake mechanism, a power plate, a braking disc in facewise relation thereto and adapted to be shifted laterally for effecting braking action, a detachable disc seated in one of said parts and having inclined surfaces and being free to oscillate in its seat, and a roller interposed between the two first-mentioned parts and located to ride on said inclined surfaces.

The invention still further includes, in the combination last recited, an additional disc similarly seated in the opposing part and having similar inclined surfaces engaged by the interposed roller.

The invention still further includes, in the combination last recited, means for preventing oscillatory movement of one of the discs.

The invention still further comprises certain other novel constructions, combinations, and arrangements of parts as hereinafter specified and subsequently pointed out in the appended claims.

In the accompanying drawings,—

Figure 1 is an end view of a wheel structure incorporating an embodiment of the present invention.

Figure 2 is a vertical section therethrough taken on several planes, some angular with respect to others, as indicated by line 2—2 of Figure 1, a fragment of the demountable rim being indicated in position.

Figure 3 is a face view of the inner face of the power plate detached.

Figure 4 is a fragmentary face view of the outer face of the co-operating brake disc detached.

Figure 5 is a fragmentary section through the prime actuator, power plate, and outer brake disc, parts being seen in elevation.

Figure 6 is a cross section through one of the rollers showing the contiguous parts in section, parts being seen in elevation.

Figure 7 is a diagrammatic, exaggerated showing for illustrating the angular adjustment of the insert discs for the rollers.

Figure 8 is a view similar to Figure 5 of a somewhat modified embodiment, the section being taken transversely of the slot in the brake disc.

As will become apparent, the present invention is well adapted for use wherever brake mechanism is desirable, but one of the most effective applications of the invention is illustrated by its use in conjunction with automobile wheels, both front and rear, that is both dirigible and power driven, and it should be understood that the invention is also well adapted for use in conjunction with any of the popular types of wheels now commonly employed, some of which are illustrated in my above-identified co-pending application. The invention itself does not relate to the wheel but to the power transmission and control, and is adapted for utilization with any wheel to which it may be applied.

Referring to the drawings by numerals, 1 indicates the rear wheel of an automobile construction, selected for illustrative disclosure only, but with the understanding that the wheel may be a front wheel or dirigible wheel, as seen in my above-identified co-pending application in Figures 18, 25, and 31 and other figures of the drawings thereof. Wheel 1 is mounted upon and to rotate about the tubular or dead axle 2 through which extends the power or live axle 3. A rim 4 is demountably attached to the wheel 1, as by wedging nuts 5, but these details of construction are disclosed for illustrative application only and may be varied to any extent, or omitted in part where inapplicable or undesired.

Outstanding axially from and fixed to the wheel 1 are power transmitting and guide pins 6, each preferably extending through and anchored to a power delivering spider 7, which spider is provided with a centrally located, inwardly-extending sleeve 8 surrounding the outer or hub portion of axle 3, and preferably keyed thereto by a key 9 for receiving power from the axle. The sleeve and hub are preferably cooperatively tapered for effective connection, and a retaining nut 10 is preferably threaded onto the exposed or outer end of the live axle 3 to prevent axial outward movement of spider 7. A nut 11 engages the outer end of each of the respective pins 6 and cooperates to retain the spider in its proper position and clamp the outer end portions of the arms of the spider each against an appropriate stop or encircling shoulder 12 on the respective pin 6.

Between the shoulder 12 and an enlarged portion of each pin 6 constructed to effect rigid engagement with the wheel 1, each pin 6 is provided with a cylindrical portion surrounded by a guiding eye or perforated lug 13 which surrounds and is free to slide longitudinally on the said cylindrical portion of the respective pin 6. The several perforated lugs 13 outstand radially from the rotor brake disc 14. It is popular practice to call the parts 14 a brake disc, though it is in fact an annulus having a central, enlarged bore to accommodate the passage therethrough of the several parts which it surrounds, including the axle, hub, and sleeve 8, and parts outward thereof.

Cooperating with the brake disc 14 are an inner disc 15 and an outer disc 16 with disc 14 therebetween. The inner disc 15 is anchored, as by bolts 17, to the hub portion 18 mounted on and appropriately fixed to the outer end portion of the dead axle 2. Guiding bolts 19, 19, are fixed at their inner ends to the inner disc 15 and outstand axially therefrom through the outer disc 16 so as to allow the outer disc freedom to slide axially. The outer disc 16 is formed with an aperture 20 for each of the bolts 19, each aperture 20 being elongated in a circumferential direction, as plainly seen in Figure 4, so as to allow the disc 16 to have a certain amount of freedom for angular play.

Outward of the disc 16 is arranged the stationary plate 21, which may appropriately be called the energizing or reaction or power plate, since the power thrust against the disc 16 is sustained and resisted by the plate 21. Plate 21 may be rendered stationary or rigid with respect to hub 18 and axle 2 in any of various ways, that shown consisting of the extension of bolts 19 through the plate 21, through openings 22 in the plate proportioned either to snugly receive the bolts 19 themselves or to snugly receive bushings 23, which bushings are preferably the sleeves of sleeve nuts 24 threaded onto the outer end of bolts 19 to retain the plate 21 against outward movement. It is not necessary to retain the plate against inward movement, since the stresses are all outward. As a further stay and guide for plate 21, a collar or annular boss 25 outstands from the disc 16 through the plate 21, and on which the plate is snugly seated. Of course, the seating is not tight enough to interfere with the relative angular movement of the brake disc 16.

Interposed between the disc 16 and plate 21 are rollers 26, 26, each located, as seen in Figure 6, to engage inclined surfaces of the respective parts, so that, when one is moved angularly with respect to the other, the roller will roll along such inclined surfaces and crowd themselves between the said parts and thus wedge and spread or move the parts away from each other, so that, since the plate 21 can not move outward, the disc 16 will be thrust axially inward. For each roller 26 special wearing surfaces are provided by the employment of insert plates 27 and 28 set within the disc 16 and plate 21, respectively. Each insert plate 27 and 28 is preferably of wear-resisting material, such as properly tempered and hardened steel, though, of course, the plates 27 and 28 may be made of case-hardened material, if preferred. When the plates 27 and 28 are merely case-hardened, it is preferable to have them case-hardened by the well known cyanide process, but, in view of the work performed by these plates, it is desirable that they be of a high degree of wear-resisting capacity, and, therefore, in some instances at least, it may be preferred to employ a high carbon steel and properly temper the plates to make them comparable with hardened tool steel. Each of the plates 27 and 28 is preferably in the form of a disc, and the part, 16 or 21 as the case may be, engaged is formed with a recess 29 shaped to snugly receive the respective plate and preferably of a depth equal to the thickness of the plate. Each recess 29 is circular in cross section to correspond with the disc seated therein, so that the plates 27 and 28 are free to move angularly within their receiving recesses 29; but it is preferable to prevent such movement of the plates 28, and, therefore, I provide a pin 30 extending radially from the plate 28 into a notch or slot 31 formed in the plate 21 and opening at the inner face thereof. Each of the discs or plates 27, 28 may be readily manually inserted into the recesses 29 when the parts are being assembled, and the disc or plate 27 is left free to have angular movement or oscillate within its recess. An aperture 32 is formed through the disc 16, and a similar aperture 32 is formed through the plate 21, each leading to the respective recess 19 so that, when the parts are separated, a tool or appropriate instrument can be inserted through the respective aperture 32 to drive out or knock out the disc from the recess 26. Otherwise some difficulty might be experienced notwithstanding the fact that the discs are not fitted tightly in the recesses.

Each disc 27 and 28 is formed with a slot-like recess or groove 33 across its exposed face providing inclined sides engaged by the roller 26, so that the roller can ride up, that is roll along one inclined side of one of the grooves while acting similarly with the correspondingly opposed inclined side of the other groove.

By the provision of the disc 27 with the grooves 33, with freedom of movement of disc 27 angularly, it is entirely feasible and efficient to employ the rollers 26 in the form of cylinders which may be of any appropriate length. It will be noted that in my above-identified co-pending application rollers are shown, for instance in Figure 2 of the drawings of said application, which are cylindrical but are formed relatively short because they travel in an arcuate path, and, therefore, outer portions of the roller must move or tend to move at a different rate from inner portions during rolling movement along such arcuate path. Thus, a certain amount of friction is unavoidable with the form of roller shown in Figure 2 of said co-pending application, and to overcome this friction there is shown elsewhere in the said co-pending application, as for instance in Figures 17 and 18, the employment of truncated cone rollers. These rollers, however, require a great deal of scientific care in the provision of the recesses in which they function to enable the parts to maintain proper alinement. The expense of forming the necessary recesses with the required precision is an objectionable feature to the use of such truncated cone rollers. Of course, it should be understood that both forms of rollers as shown in my said co-pending application are effective and thoroughly practicable, but do possess the objections indicated, which objections are fully overcome by the present invention, and particularly by the employment of an oscillatory plate for each roller which enables the bearing surface against which the roller acts to adjust itself to maintain the required alinement with the opposing bearing surface. This adjustment is indicated in rather exaggerated showing in Figure 7 where the angular movement of the discs relative to each other is indicated by the dash lines 34, which lines will be seen to converge so that, if there were no compensating movement provided, one end portion of the respective roller 26 would tend to move more rapidly than the other end portion in the direction of rotation, since the travel of the roller bodily is on the path of an arc, and, therefore, torsional stress is exerted on the roller and friction develops between portions of the roller and portions of the parts engaged by it. By allowing the disc 27 to adjust itself angularly and thereby maintain parallelism of the groove 33 of disc 27 with groove 33 of disc 28, no such friction occurs, and the roller is not subjected to any torsional stress but rolls smoothly along the engaged surfaces.

Thus, the disc 27 is particularly valuable in enabling the employment of the cylindrical form of rollers without any of the drawbacks heretofore experienced, and also it will be observed that the wearing surfaces engaged by the roller can be especially treated and prepared to resist wear, as by being hardened as above indicated. Very little, if any, wear actually occurs in practice with this structure, as indicated by demonstration and experimentation in which parts of this kind have been used for not less than thirty-five hundred miles without showing any visible or measureable wear. But, of course, it is conceivable that sand or other foreign matter might at some time find its way into the grooves 33, which would of course result very quickly in substantial wear. When that happens, the removal and replacement of the discs 27 and 28 is a comparatively simple matter. Also, by the employment of these discs or plates 27 and 28, the hard wearing surfaces are inexpensively provided without any necessity for expensive material or expensive treatment for the disc 16 or the plate 21. Of course, it is not preferable to employ tempered steel for the disc 16 because of possibility of being heated at times, though of course high speed steel could be used if not considered prohibitively expensive. All the facts being considered, the insert discs obviously possess a substantial advantage both in saving of initial cost and subsequent cost, and also in insuring maximum efficiency notwithstanding employment of the cylindrical discs of whatever length desired without resulting friction.

The action of the rollers 26, of course, is constantly under the control of the operator and can not take place until an initial or prime operation of brake disc 16 occurs. This priming operation is fully set forth in my above-identified co-pending application, consisting essentially of shifting the disc 16 bodily toward the disc 14 which results in a pick-up of disc 16 under frictional engagement with disc 14, and an angular movement of disc 16 with the turning movement of disc 14 as the same revolves with the wheel. This angular movement is comparatively slight and must necessarily be so since the rollers 26 require but a very slight movement to impart a very substantial axial thrust to the disc 16, which, of course, increases the frictional engagement of disc 16 with disc 14. Obviously, the lateral movement of disc 16 causes the disc 14 to move laterally and frictionally engage the disc 15 so that disc 14 is retarded in its rotative movement by the frictional resistance of both discs 15 and 16.

Appropriate brake linings 35 are carried by the respective discs and take the wear of the frictional engagement between the discs.

To afford the required initial or priming action of the disc 16, a prime mover is provided consisting of a draw bar 36 extending inward through the hub 18 and having means at its inner end portion for exerting a pull on the bar and having means at its outer end portion for delivering movement from the bar to the disc 16. The means for pulling the bar 36 may be widely varied in detail, one form of such means being shown in Figure 2 as consisting of an eye 37 at the inner end of the bar 36 engaged by a pivot pin or bolt 38, which in turn is engaged by an actuator 39 to impart the inward pull desired for initially moving the disc 16. The actuator 39 may consist of an eccentric cam 40 and an appropriate lever for swinging the cam to cause increasing portions of the cam to be interposed between the pin 38 and the bearing surface 41 of the cam, whereby the pin 38 is moved bodily inward and thus pulls the bar 36 inward.

Operatively connected to the outer end of the draw bar 36 is a cross bar or plate 42, as best seen in Figure 5, which is located in a slot 43 in the power plate or energizing disc 21. Interposed between the plate 42 and the brake disc 16 are thrust pins for delivering the pull of the bar 36 as an axially inward thrust to the disc 16. The said thrust pins are, of course, capable of various embodiments, but consist, as seen in Figure 5, of a pair of pins 44 each preferably terminating at its outer end in a ball-like bearing end 45 seated in the parti-globular inner end of a recess 46 in the plate 42, while the inner end of each pin 44 is rounded off or formed parti-globular, as seen at 47, seated in the similarly rounded inner end of the socket or recess 48 in the brake disc 16. Thus, each pin 44 is free to tilt and swing pivotally with respect to the engaged or contacted parts while imparting motion from one to the other, and, therefore, the said pins have a kind of toggle link action as they provide for the thrust from plate 42 to disc 16 not only while the pins are in the outstanding relation seen in Figure 5, but in any of the other positions which they may assume incident to the fact that the disc 16 is caused to move angularly following the thrust. As will become apparent, the thrust of the pins 44 must be maintained at all times on the disc 16 during which braking action is intended to be accomplished, and as soon as the draw bar 36 is released, so that the thrust pressure of pins 44 is relieved from disc 16, the disc releases itself from braking engagement with disc 14 and the braking action ceases. To insure prompt release and cessation of such braking action, a spring 49 is interposed between disc 15 and disc 16 surrounding the sleeve 8, whereby the disc 16 is caused to move outwardly and out of braking engagement as soon as released. The disc 14, of course, moves free from frictional engagement with disc 15 with the release of the braking engagement of disc 16. A slot 52 is provided in disc 16 to accommodate bar 36.

It should be understood that the increase in the braking engagement of disc 16 with disc 14 incident to the action of rollers 26 is due to the angular shifting of disc 16 under the thrust of the disc 14 whether from power-driven action or momentum, and if, in fact, the thrust is slight, the braking action will be proportionally slight, or if the thrust is more extended, or, in other words, the disc 16 is tilted further angularly, the braking action will be proportionally increased. Thus, the braking action will be always proportional to the rotation of the wheel 1. Regardless of such accelerated application of disc 16 and resulting accelerated application of disc 15, the draw bar 36 will always be effective to produce braking action by thrusting the disc 16 to braking engagement with disc 14. For instance, if the device is applied to an automobile and the car is standing still, and the cam 40 is thereupon moved to a position drawing the bar 36 inward, the disc 16 will have effective braking engagement with disc 14 and may thereby serve as a parking brake, commonly referred to as the "emergency brake".

The connection of the plate 42 with the draw bar 36 may be varied as preferred, but preferably consists merely in extending the bar 36 through the plate 42 and retaining the plate against escape by providing a nut 50 detachably threaded on the outer end of the bar 36 and seated against the plate 42 with the pins 44 in their proper endwise engagement with disc 17 while it is held out of braking engagement. It should be observed that the pins 44 can oscillate freely from an outstanding position, as seen in Figure 5, to various inclined positions in either direction, and the application of pressure on disc 16 by draw bar 36 will, therefore, be assured without friction and with uniformity. Furthermore, when the pins 44 assume an inclined position as a result of even a slight angular advance of the disc 16 under the impulse of disc 14, further inward pull on the draw bar 36 causes the pins 44, incident to such inclined position, to actually thrust the disc 16 in a direction having a component directed toward angular movement of the disc 16, and, therefore, toward increased application of the disc because of the action of the rollers 26 with such angular movement. Accordingly, the action of the pins 44 not only effects a direct brake application of disc 16, but contribute toward an acceleration of such brake application. The sockets or recesses in which the pins 44 are located are of sufficient size, larger than the main body portion of each pin, to allow sufficient free play for the pins to assume the required inclination during operation. The end portions of each pin 44 are preferably larger than the intermediate portion, as plainly seen in Figure 5, to facilitate maximum available inclination within a minimum enlargement of the respective recess.

It is believed that the operation of the structure will be readily understood from the foregoing, but may be briefly stated as follows:

If the vehicle is standing still and the prime actuator made up of the draw bar 36 and its connected parts is given an inward thrust and held in that position, the brake disc 16 is caused to have a braking action and may thus serve to prevent unexpected or undesired rotation of the wheel 1. However, if the thrust is imparted by the prime actuator to the disc 16 while the wheel 1 is revolving, the frictional contact with the disc 14 will cause disc 16 to follow the movement of disc 14 for a short distance angularly, so that the rollers 26 begin to roll along the inclined surfaces on which they rest and thereby crowd or wedge the disc 16 inward to a firmer or tighter frictional contact with disc 14, and, of course, disc 14 being free to shift laterally moves into frictional engagement or braking engagement with disc 15 whenever disc 16 frictionally engages or reaches a braking engagement with disc 14. This braking action will be proportional to the extent to which the disc 16 is moved angularly, and, therefore proportional to the velocity with which the disc 14 is revolving. When the wheel 1 either ceases its movement or slows to the desired speed, the operator by releasing the prime actuator and thereby releasing the thrust pressure of the pins 44 on disc 16 will permit the spring 49 to move disc 16 to the non-braking relation with respect to disc 14, and the braking action ceases immediately.

In Figure 8 is shown a somewhat modified embodiment of the features of the invention relating to the prime actuator, this figure being taken from my above-identified co-pending application and being a copy of Figure 23 of the drawing thereof. In the embodiment seen in Figure 8, the prime actuator imparts its movement to the brake disc through a thrust pin or toggle link pin similarly to the action of the structure seen in Figure 5 and described with reference thereto except that only one thrust pin is shown in Figure 8. The parts seen in Figure 8 are so nearly the same as the corresponding parts of Figure 5 that the same description applies and the same reference numerals have been utilized except that the outer end of the thrust pin is shown as retained in its seat by a sleeve nut 51 threaded into the surrounding recess of the actuator bar carried by the draw bar.

The importance of the present invention can hardly be exaggerated in that the action of a momentum accelerated brake is thereby rendered far superior to what has heretofore been achieved. The provision of the discs 27 and 28 not only enables effective and friction-free use of the cylindrical rollers 26 but insures practically perfect alinement and freedom from tendency of parts to tilt and get out of alinement in the action of the brake. The formation of the discs 27 and 28 separately from the parts in which they are seated enables the manufacture of the last-named parts of soft grey iron or like inexpensive material while the only surface likely to be worn is highly protected and is capable of being renewed readily in case of any such unusual occurrence as should result in wear. The pin 30 in each of the discs 28 prevents those discs from shifting while the discs 27 readily adjust themselves angularly to maintain continuous parallelism of the grooves 33, and this adjustment is automatically effected in proportion to the pressure of the braking or retarding action on the wheel 1. Not only are the parts thus perfectly alined in the first instance, but they maintain their alinement indefinitely in the perfect condition as demonstrated by many thousands of miles of tests of vehicles supplied with brakes incorporating the present improvements. There is no variation in the character of operation incident to prolonged use as demonstrated by tests.

Another essential and vital point resides in the fact that the present improved brake serves as a safety device when the wheel 1 is operating on a surface that is conducive to skidding, such as a wet, or icy, or snow-covered, or otherwise slick pavement or roadway. The lack of traction incident to such a slippery condition results in a corresponding lack of angular advance of the disc 16 with the application of the prime actuator so that where the surface is sufficiently slippery the operator must depend upon the braking action imparted wholly by himself through the draw bar 36 and obtains no power application of the brake, but as soon as the wheel reaches a dry surface or a surface where the traction increases the impartation of angular movement to disc 16 is developed and rendered proportional so that a proportional increase in the braking action occurs. Tests made on spotted pavements, part icy and part clean concrete, have demonstrated that when any wheel supplied with a brake incorporating the present invention strikes the clean concrete, the brake application is automatic and proportional to the pressure on the prime actuator or draw bar 36; but, on the icy surface, the release of the accelerated brake action is immediate and automatic. The prime actuator pressure, therefore, affords the only braking action obtained while the traction is at zero. Thus, the brake insures against skidding or deflections of the vehicle at practically any and all speeds and on any and all roadway conditions. There is no tendency to seize or suddenly effect braking action, but the application of the brake is smooth and uniform at all times.

What is claimed is:—

1. In brake mechanism, the combination, with a rotative part and a relatively non-rotative part adapted to be moved laterally into braking engagement with said rotative part and to have limited angular movement, of a stationary part, a roller interposed between the stationary part and the laterally movable part adapted to be moved therebetween incident to angular movement of said laterally movable part, and opposed inclined surfaces providing means engaged by said roller for imparting a lateral thrust to said laterally movable part incident to movement of said roller, the said inclined surfaces providing means being in detachable contact with one of said parts and one of said surfaces being freely movable with respect to the other in the angular movement of the rotative part.

2. In apparatus of the class described, the combination, with a brake disc and an energizing plate, each having a circular recess opening toward the other, a disc in each of said recesses, each of said discs being formed with a groove facing the groove of the other disc, one of said discs being freely movable relative to the other, a freely shiftable roller interposed between and engaging inclined surfaces of said grooves, and spring means for urging the brake disc toward the energizing plate for moving the roller down the inclined surfaces.

3. The combination as claimed in claim 2 wherein one of the discs is fixed in its recess while the other is freely movable in its recess relative to the other disc and the roller is cylindrical.

4. In brake apparatus, the combination, with a brake disc adapted to have braking action when moved laterally, of an energizing plate cooperating therewith, and means between the brake disc and energizing plate for thrusting the brake disc to a braking action upon angular movement of the brake disc, of thrust means engaging the brake disc for thrusting the same laterally and stressing the same in a direction for effecting angular movement thereof.

5. The combination as claimed in claim 4 wherein said thrust means comprises a draw bar and a thrust pin engaging the brake disc and located to receive and impart thrust from the draw bar both directly laterally of the brake disc and in the direction of angular movement of the brake disc.

6. The combination as claimed in claim 4 wherein the thrust means comprises a draw bar, a cross plate carried thereby, and freely oscillatory pins between said cross plate and said brake disc.

7. The combination as claimed in claim 4 wherein the thrust means comprises a draw bar, a cross plate carried thereby, and freely oscillatory pins between said cross plate and said brake disc, the said cross plate and brake disc having recesses in which said pins are located proportioned relative to the pins for permitting oscillatory play thereof.

8. In apparatus of the class described, the combination, with a brake disc and an energizing plate, each having a circular recess opening toward the other, a disc in each of said recesses, each of said discs being formed with a groove facing the groove of the other disc, one of the discs being angularly movable in its recess and the other disc being held against angular movement, and a roller interposed between and engaging inclined surfaces of said grooves.

9. In apparatus of the class described, the combination, with a brake disc and an energizing plate, each having a circular recess opening toward the other, a disc in each of said recesses, each of said discs being formed with a groove facing the groove of the other disc, one of the discs being angularly movable in its recess and the other disc being provided with a pin projecting radially from the disc into a notch extending laterally from the recess in which the last-mentioned disc is mounted, and a roller interposed between and engaging inclined surfaces of said grooves.

HOMER T. LAMBERT.